US010469697B2

(12) United States Patent
Murase et al.

(10) Patent No.: US 10,469,697 B2
(45) Date of Patent: Nov. 5, 2019

(54) READING MODULE AND IMAGE READING DEVICE INCLUDING SAME, AND IMAGE FORMING APPARATUS

(71) Applicant: KYOCERA Document Solutions Inc., Osaka (JP)

(72) Inventors: Takaaki Murase, Osaka (JP); Kei Ouchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/056,010

(22) Filed: Aug. 6, 2018

(65) Prior Publication Data

US 2019/0045075 A1 Feb. 7, 2019

(30) Foreign Application Priority Data

Aug. 7, 2017 (JP) ................................. 2017-152138

(51) Int. Cl.
*H04N 1/195* (2006.01)
*H04N 1/193* (2006.01)
*H04N 1/10* (2006.01)

(52) U.S. Cl.
CPC ....... *H04N 1/19531* (2013.01); *H04N 1/1052* (2013.01); *H04N 1/1933* (2013.01); *H04N 1/1934* (2013.01); *H04N 1/19547* (2013.01)

(58) Field of Classification Search
CPC ............. H04N 1/1933; H04N 1/19531; H04N 1/19547
See application file for complete search history.

(56) References Cited

U.S. PATENT DOCUMENTS

| 8,345,325 B2 | 1/2013 | Schmidt et al. .............. 358/475 |
| 2010/0284045 A1* | 11/2010 | Kawano ................. G03B 27/50 358/474 |
| 2013/0342879 A1* | 12/2013 | Joh .......................... H04N 1/10 358/496 |
| 2017/0126923 A1* | 5/2017 | Natori ................ H04N 1/00013 |

FOREIGN PATENT DOCUMENTS

JP        2003-121608 A        4/2003

* cited by examiner

*Primary Examiner* — King Y Poon
*Assistant Examiner* — Michael L Burleson
(74) *Attorney, Agent, or Firm* — Stein IP, LLC (57) ABSTRACT

Provided is a reading module including a light source, an optical system, and a sensor. The optical system images reflected light of light emitted from the light source to the document, as image light. The sensor converts the imaged image light into an electric signal. The optical system includes a mirror array in which a plurality of reflection mirrors are connected, and a plurality of aperture stops. Neighboring reflection mirrors reflect light at different angles viewed from the main scanning direction.

9 Claims, 5 Drawing Sheets

FIG.8

READING MODULE AND IMAGE READING DEVICE INCLUDING SAME, AND IMAGE FORMING APPARATUS

INCORPORATION BY REFERENCE

This application is based upon and claims the benefit of priority from the corresponding Japanese Patent Application No. 2017-152138 filed Aug. 7, 2017, the entire contents of which are hereby incorporated by reference.

BACKGROUND

The present disclosure relates to a reading module used in a digital copier, an image scanner, or the like, which irradiates a document with light and reads image light reflected from the document, and to an image reading device including the reading module, as well as to an image forming apparatus.

Conventionally, there are two types of reading methods for an image reading device mounted in a multifunction peripheral or the like utilizing electrophotographic process. One is a CCD method using a charge coupled device (CCD) sensor, and the other is a CIS method using a photoelectric conversion element called a complementary MOS (CMOS) sensor.

The CCD method is a method of reading an image that is reduced using an image sensor having a size that is $\frac{1}{5}$ to $\frac{1}{8}$ of a document size, and a plurality of flat mirrors and optical lenses. A merit of the CCD method is that a depth of field is large. The depth of field means a range in an optical axis direction in which the image looks in focus when an object (i.e. the document) is moved from the just focused position in the optical axis direction. In other words, it means that when a depth of field is large, not so blurred image can be read even if the document is shifted from a normal position.

On the other hand, a demerit of the CCD method is that it has a very long optical path length (light propagation length from the object to the sensor) of 200 to 500 mm. In order to secure the long optical path length in a limited space inside the carriage, the image reading device uses a plurality of flat mirrors to change light propagation direction. Therefore, the number of components is increased, and hence cost is increased. In addition, in a case where a lens is used in the optical system, chromatic aberration occurs due to a difference in refractive index depending on wavelength. In order to correct the chromatic aberration, a plurality of lenses are necessary. This also causes an increase in cost.

The CIS method is a method in which a plurality of erecting same-scale rod lenses are arranged in an array, and the image to be read is formed on an image sensor having substantially the same size as a document. A merit of the CIS method is that it has an optical path length of 10 to 20 mm, which is shorter than that of the CCD method, and has a small size. In addition, because only the rod lenses are used for imaging, mirrors are not necessary unlike the CCD method so that a scanner unit including a CIS sensor can be slimed, and hence cost can be reduced because its structure is simple. On the other hand, because the CIS method has a very small depth of field, if a document is shifted from a normal position in the optical axis direction, a variation in magnification among the lenses largely affects and causes image blur. As a result, the CIS method has a demerit that a book document or a non-flat document cannot be read uniformly.

In recent years, another method different from the CCD method and the CIS method described above is proposed. In this method, an image is read by using a reflection mirror array as an imaging optical system. This method uses a plurality of reflection mirrors arranged in an array so that read document images of reading areas corresponding to the reflection mirrors are formed on the sensor as a reduced and inverted images. However, unlike the CIS method using the rod lens array, one area is read and imaged by one optical system. In addition, a telecentric optical system is adopted as an imaging system, and hence image blur due to overlapping of images having different magnifications does not occur when a plurality of areas of a document are read separately. Thus, image blur is prevented, and a compound-eye reading method is realized.

Further, because this method uses only mirrors in the optical system, chromatic aberration does not occur unlike the case of using a lens in the optical system. Therefore it is not necessary to correct chromatic aberration, and hence the number of elements forming the optical system can be reduced.

SUMMARY

A reading module according to a first aspect of the present disclosure includes a light source, an optical system, and a sensor. The light source illuminates a document. The optical system images reflected light of light emitted from the light source to the document, as image light. The sensor has a plurality of imaging areas for converting the image light imaged by the optical system into an electric signal. The optical system includes a mirror array including a plurality of reflection mirrors connected in a main scanning direction in an array, each of the reflection mirrors having an aspheric concave reflecting surface, and a plurality of aperture stops each disposed between each reflection mirror and each imaging area of the sensor so as to adjust light intensity of image light reflected by each reflection mirror. The reflection mirrors are arranged so that neighboring reflection mirrors reflect light at different angles viewed from the main scanning direction, and the imaging areas are arranged so that neighboring imaging areas do not overlap each other in a perpendicular direction that is perpendicular to the main scanning direction.

Other objects of the present disclosure and specific advantages obtained by the present disclosure will become more apparent from the description of embodiments given below.

DETAILED DESCRIPTION

Figure 1:
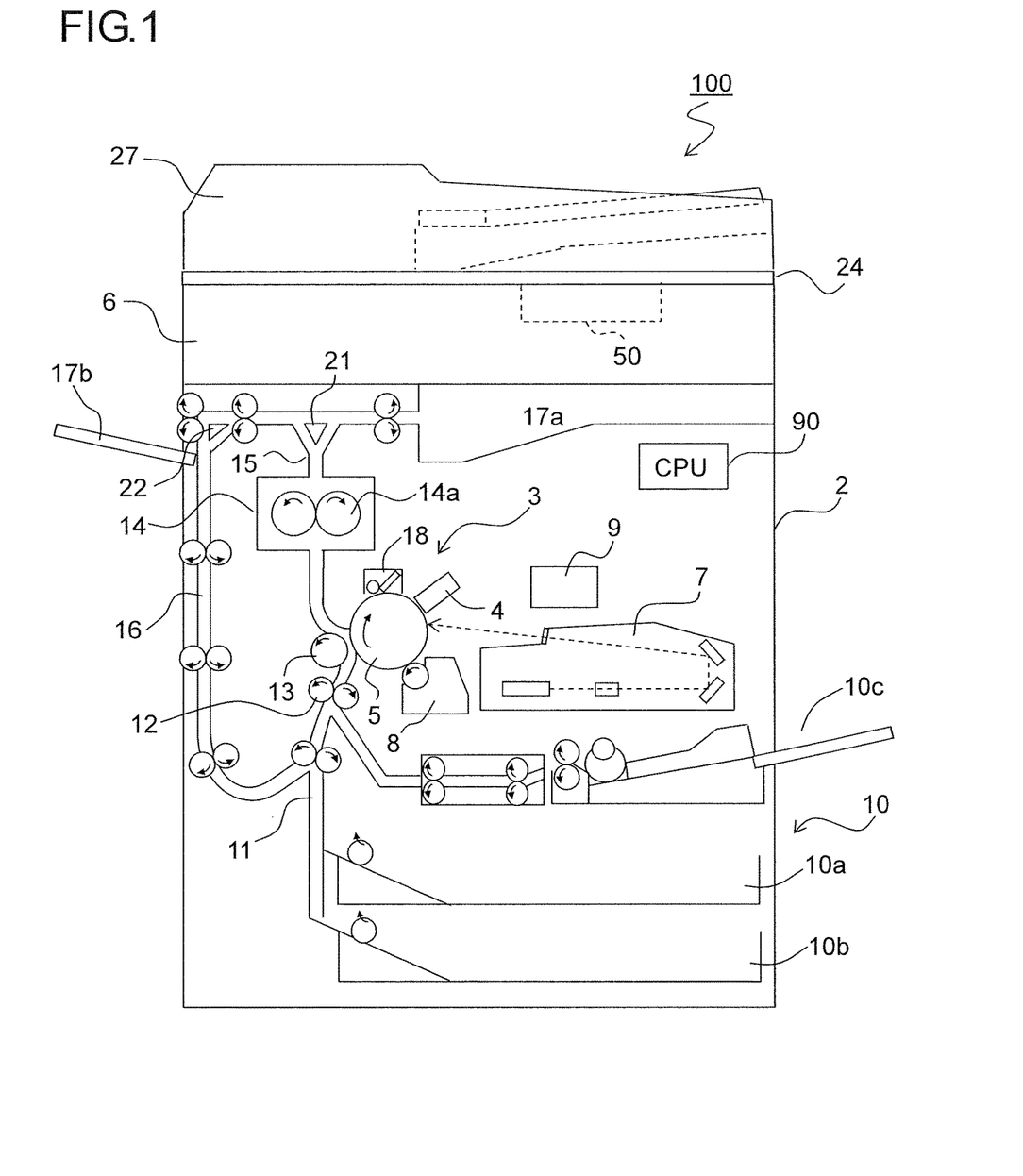
FIG. 1 is a cross-sectional side view illustrating an overall structure of an image forming apparatus 100 including an image reading unit 6 using a reading module 50 of the present disclosure.

An embodiment of the present disclosure is described below with reference to the drawings. FIG. 1 is a schematic structural diagram of an image forming apparatus 100 including an image reading unit 6 using a reading module (reading device, image reading unit) 50 of the present disclosure. In FIG. 1, when a copying operation is performed using the image forming apparatus 100 (e.g. a digital multifunction peripheral), the image reading unit 6 described later reads image data of a document and converts it to an image signal. On the other hand, in an image forming unit 3 inside a multifunction peripheral main body 2, an electrification unit 4 uniformly electrifies a photosensitive drum 5 rotating in a clockwise direction in FIG. 1. Further, an exposing unit (such as a laser scanning unit) 7 emits a laser beam and forms an electrostatic latent image on the photosensitive drum 5 according to document image data read by the image reading unit 6. A developing unit 8 applies developer (hereinafter referred to as toner) to the formed electrostatic latent image so that a toner image is formed. The toner is supplied to the developing unit 8 from a toner container 9.

Toward the photosensitive drum 5 on which the toner image is formed as described above, a paper sheet is conveyed from a sheet feeding mechanism 10 to the image forming unit 3 via a sheet conveying path 11 and a registration roller pair 12. The sheet feeding mechanism 10 includes sheet feed cassettes 10a and 10b, and a stack bypass (manual tray) 10c disposed above them. The conveyed paper sheet passes through a nip between the photosensitive drum 5 and a transfer roller 13 (image transferring unit) so that the toner image on the surface of the photosensitive drum 5 is transferred onto the paper sheet. Further, the paper sheet with the transferred toner image is separated from the photosensitive drum 5 and is conveyed to a fixing unit 14 including a fixing roller pair 14a so that the toner image is fixed. After the paper sheet passes through the fixing unit 14, the conveying direction of the paper sheet is switched by a path switching mechanism 21, 22 disposed at a branch point of a sheet conveying path 15. In other words, the paper sheet is directly discharged to sheet discharging portion including a first discharge tray 17a and a second discharge tray 17b, or is conveyed to a reverse conveying path 16 and is discharged to the same after double-sided printing.

Toner remaining on the surface of the photosensitive drum 5 after the toner image is transferred is removed by a cleaning device 18. In addition, charge remaining on the surface of the photosensitive drum 5 is eliminated by a charge elimination device (not shown) disposed on a downstream side of the cleaning device 18 in a rotation direction of the photosensitive drum 5.

The image reading unit 6 is disposed in the upper part of the multifunction peripheral main body 2, a platen (document presser) 24 is disposed openably and closably so as to press and hold a document placed on a contact glass 25 of the image reading unit 6 (see FIG. 2), and a document feeder 27 is disposed on the upper surface of the platen 24.

Further, inside the multifunction peripheral main body 2, a control unit (CPU) 90 is disposed to control operations of the image forming unit 3, the image reading unit 6, the document feeder 27, and the like.

Figure 2:
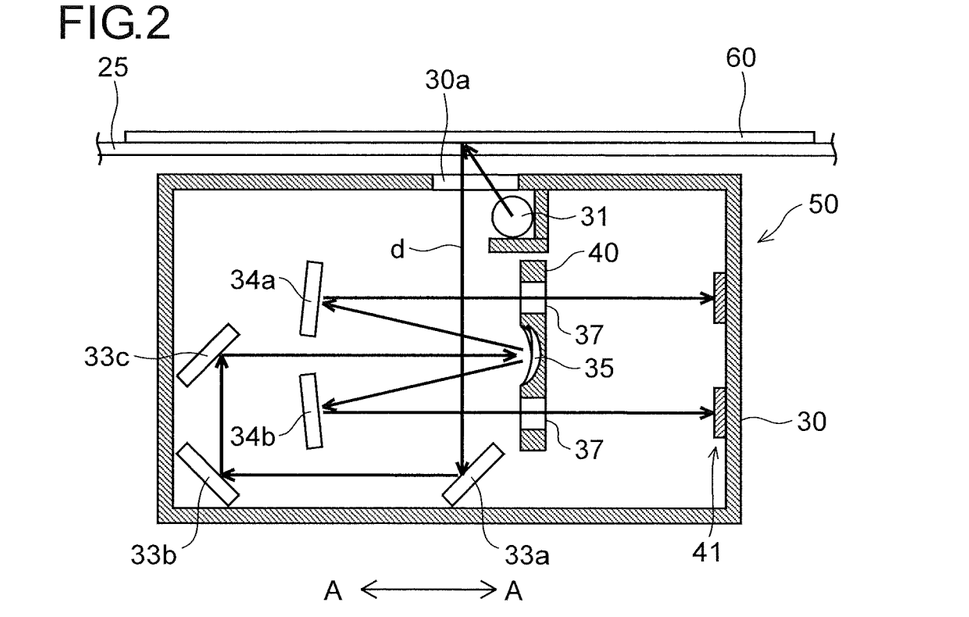
FIG. 2 is a cross-sectional side view illustrating an internal structure of the reading module 50 mounted in the image reading unit 6 according to one embodiment of the present disclosure.
Figure 3:
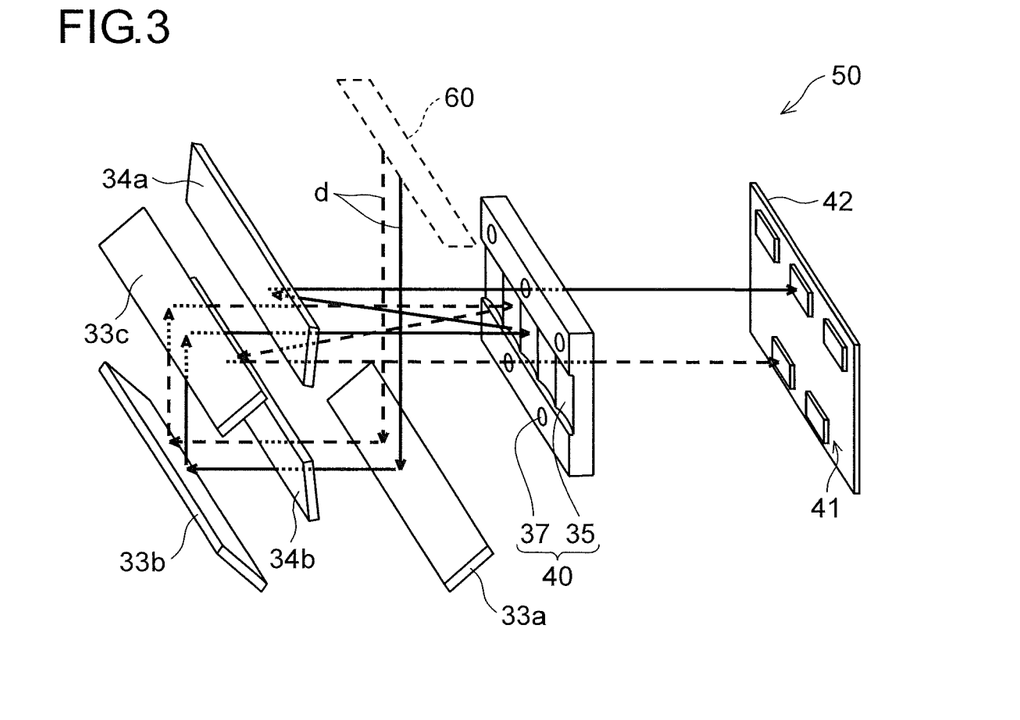
FIG. 3 is a partial perspective view illustrating the internal structure of the reading module 50 according to one embodiment of the present disclosure.
Figure 4:
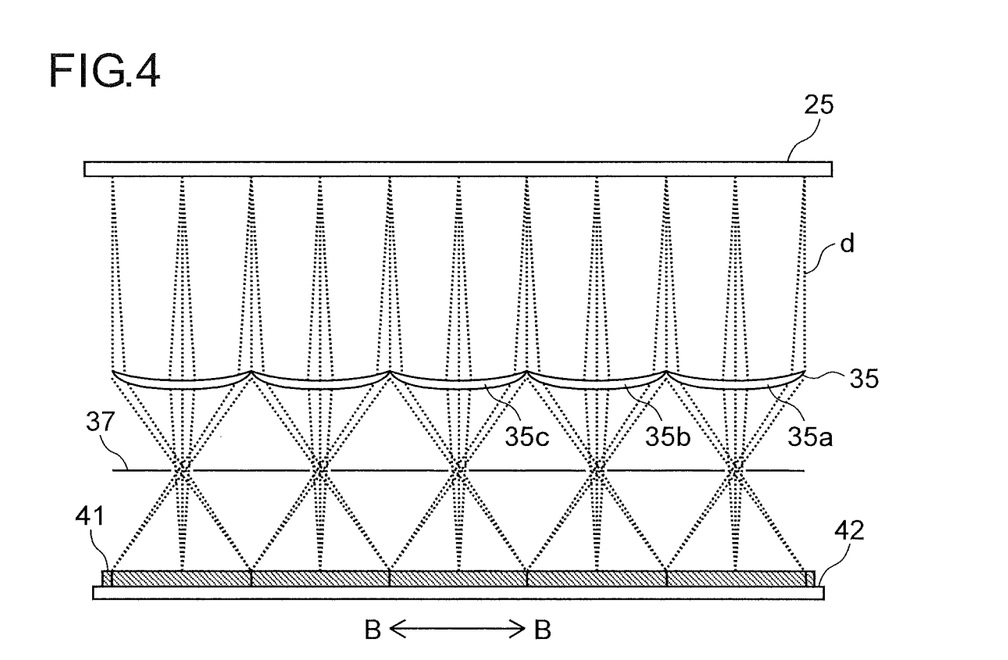
FIG. 4 is a cross-sectional plan view illustrating a structure between an optical unit 40 and a sensor 41 in the reading module 50 according to one embodiment of the present disclosure.

FIG. 2 is a cross-sectional side view illustrating an internal structure of the reading module 50 mounted in the image reading unit 6 according to one embodiment of the present disclosure, FIG. 3 is a perspective view illustrating an optical path from a document 60 to a sensor 41 in the reading module 50 of this embodiment, and FIG. 4 is a cross-sectional plan view illustrating a structure between an optical unit 40 and the sensor 41 inside the reading module 50 of this embodiment. Note that a mirror array 35 constituting the optical unit 40 in FIG. 4 reflects light rays, but FIG. 4 illustrates a model in which light rays pass through the optical unit 40, for convenience sake of description.

The reading module 50 moves in a sub-scanning direction (in an arrow AA' direction) while reading an image of a surface side (lower surface side in FIG. 2) of the document 60 placed on the contact glass 25. In addition, the reading module 50 reads an image of a surface side of the document 60 fed by the document feeder 27 (see FIG. 1) while stopping at a position just below an automatic reading position of the contact glass 25.

As illustrated in FIG. 2, inside a case 30 of the reading module 50, disposed are a light source 31, flat mirrors 33a, 33b, and 33c, the mirror array 35 including a plurality of reflection mirrors each of which has an aspheric concave reflecting surface, a first turning mirror 34a, a second turning mirror 34b, an aperture stop 37, and the sensor 41 as reading means. The sensor 41 is supported by a sensor substrate 42 (see FIG. 3). In addition, the reading module 50 has a home position just below a shading plate (not shown) for obtaining white color reference data.

In the structure described above, when reading a document image by a document fixing method, first, the document 60 is placed on the contact glass 25 with an image surface facing downward. Further, the light source 31 emits light, which passes through an opening 30a to illuminate the image surface of the document 60 while the reading module 50 moves at a predetermined speed from a scanner home side to a scanner return side. As a result, the light reflected by the image surface of the document 60 becomes image light d (as shown in FIG. 2 by a solid line arrow), which changes its optical path being reflected by the flat mirrors 33a and 33b, and then is reflected by the flat mirror 33c in the direction toward the mirror array 35. The reflected image light d is reflected and condensed by the mirror array 35 to the upper side or the lower side in FIG. 2, is reflected again by the first turning mirror 34a or the second turning mirror 34b, and passes the aperture stop 37 so as to be imaged on the sensor 41. The imaged image light d is decomposed into pixels by the sensor 41 and is converted into an electric signal corresponding to density of each pixel, so that reading of the image is performed.

On the other hand, when reading the document image by a sheet through method, the reading module 50 is moved to a position just below the image reading area of the contact glass 25 (image reading position). Further, sheets of the document 60 are sequentially sent to the image reading area while being lightly pressed by the document feeder 27, and the image surface of the document is illuminated with light from the light source 31, while the image light d reflected by the image surface is imaged on the sensor 41 via the flat mirrors 33a to 33c, the mirror array 35, the first turning mirror 34a or the second turning mirror 34b, and the aperture stop 37, so that reading of the image is performed.

As illustrated in FIG. 3, the mirror array 35 and the aperture stop 37 are integrally formed of the same material, so as to make one unit, i.e. the optical unit (optical system) 40. By integrally forming the mirror array 35 and the aperture stop 37, a relative position between the mirror array 35 and the aperture stop 37 can be accurately secured. In this way, it is possible to effectively prevent deterioration in imaging performance due to a change of temperature causing a change of the relative position between the mirror array 35 and the aperture stop 37 due to expansion or contraction thereof.

The first turning mirror 34a and the second turning mirror 34b are arranged at positions facing the mirror array 35 so as to reflect light rays (image light d), which are reflected by the mirror array 35 and enter the aperture stop 37.

Note that the aperture stop 37 is a circular opening and adjusts light intensity of the image light d to be imaged on the sensor 41.

As illustrated in FIG. 4, the mirror array 35 for imaging the image light d on the sensor 41 has a structure in which a plurality of reflection mirrors 35a, 35b, 35c, etc. corresponding to predetermined areas of the sensor 41 are connected in the main scanning direction (arrow BB' direction) in an array.

With the structure of this embodiment, the light rays of the image light d reflected by reading areas Ra, Rb, etc. (see FIG. 5) of the document 60 divided in the main scanning direction change their optical paths using the flat mirrors 33a to 33c (see FIG. 2), and enter the reflection mirrors 35a, 35b, 35c, etc. of the mirror array 35. The light rays of the image light d are reflected by the reflection mirrors 35a, 35b, 35c, etc. in the same-scale imaging magnification, and are reflected again by the first turning mirror 34a or the second turning mirror 34b, and then pass through the aperture stops 37 so as to be imaged in corresponding imaging areas of the sensor 41 as inverted images.

The inverted image imaged in each imaging area is converted into a digital signal. Therefore, data of each imaging area is inverted to be an erected image, and images of the imaging areas are combined so that an output image is formed.

In addition, the aperture stop 37 is disposed at a focal point of each of the reflection mirrors 35a, 35b, 35c, etc. constituting the mirror array 35, and hence a physical separation distance between the aperture stop 37 and the mirror array 35 (distance in the up and down direction in FIG. 2) is determined by a contraction scale (the same scale in this example) of the mirror array 35. Because the reading module 50 of this embodiment has a structure in which the first turning mirror 34a or the second turning mirror 34b reflects the light rays, an optical path length from the mirror array 35 to the aperture stop 37 can be secured, and an incident and reflection angle of the image light d with respect to the mirror array 35 can be minimized. As a result, curvature of an image imaged in each of imaging areas 41a, 41b, etc. (see FIG. 5) can be suppressed.

In the compound-eye reading method using the mirror array 35 like this embodiment, if the imaging magnification is different depending on a document position of each area corresponding to each of the reflection mirrors 35a, 35b, 35c, etc. (optical path length between the reflection mirror and the document), float of the document 60 from the contact glass 25 causes an abnormal image.

In this embodiment, between the document 60 and the mirror array 35, a telecentric optical system is adopted in which main light rays of the image light d are parallel to the optical axis. The telecentric optical system has a feature that main light rays of the image light d passing through the center of the aperture stop 37 are perpendicular to a document surface. In this way, even if the document position changes, the imaging magnification is not different among the reflection mirrors 35a, 35b, 35c, etc., and hence the reading module 50 can obtain an image having a large depth of field without image blur when the document 60 is divided into fine areas to be read. However, because the main light rays must be perpendicular to the document surface regardless of the document position, the mirror array 35 is required to have a size in the main scanning direction that is equal to or larger than the document size.

In the compound-eye reading method using the mirror array 35 as described above, in a case where the imaging areas 41a, 41b, etc. of the sensor 41 are arranged continuously in the main scanning direction, when the light rays of the image light d that pass through the aperture stops 37 after being reflected by the reflection mirrors 35a, 35b, 35c, etc. are formed in the predetermined areas on the sensor 41, the image light d outside the reading area may enter a neighboring area of the predetermined area on the sensor 41 as stray light.

Figure 5:
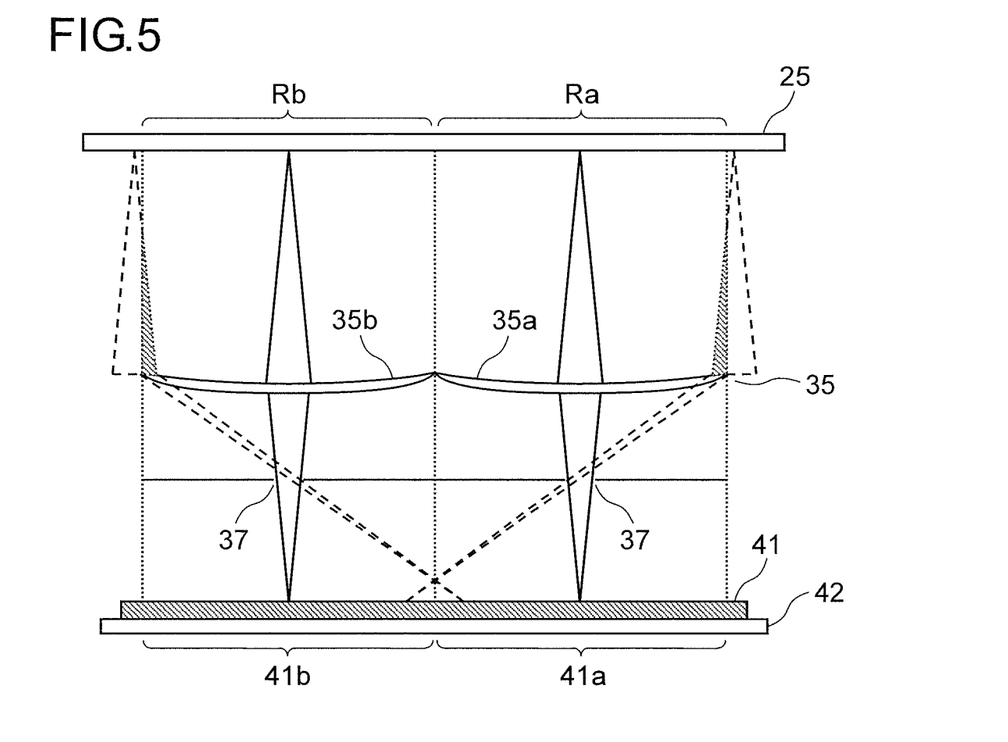
FIG. 5 is a diagram illustrating a manner in which image light d enters the sensor 41 as stray light.

FIG. 5 is a diagram illustrating a manner in which the image light d enters the sensor 41 as stray light. As illustrated in FIG. 5, light rays from the reading areas Ra and Rb corresponding to the reflection mirrors 35a and 35b are imaged on the corresponding imaging areas 41a and 41b of the sensor 41. In a case where the imaging areas 41a, 41b, etc. of the sensor 41 are arranged continuously in the main scanning direction, light rays from outside of the reading areas Ra and Rb and inside of the main light rays (hatched areas in FIG. 5) are imaged on the sensor 41 by the reflection mirrors 35a and 35b. Specifically, light reflected by the reflection mirror 35a enters the neighboring imaging area 41b, and light reflected by the reflection mirror 35b enters the neighboring imaging area 41a. These imaging light rays form inverted images corresponding to different reading areas though their light intensity is small, and hence overlapping with images to be imaged in the imaging areas 41a and 41b causes an abnormal image.

Figure 6:
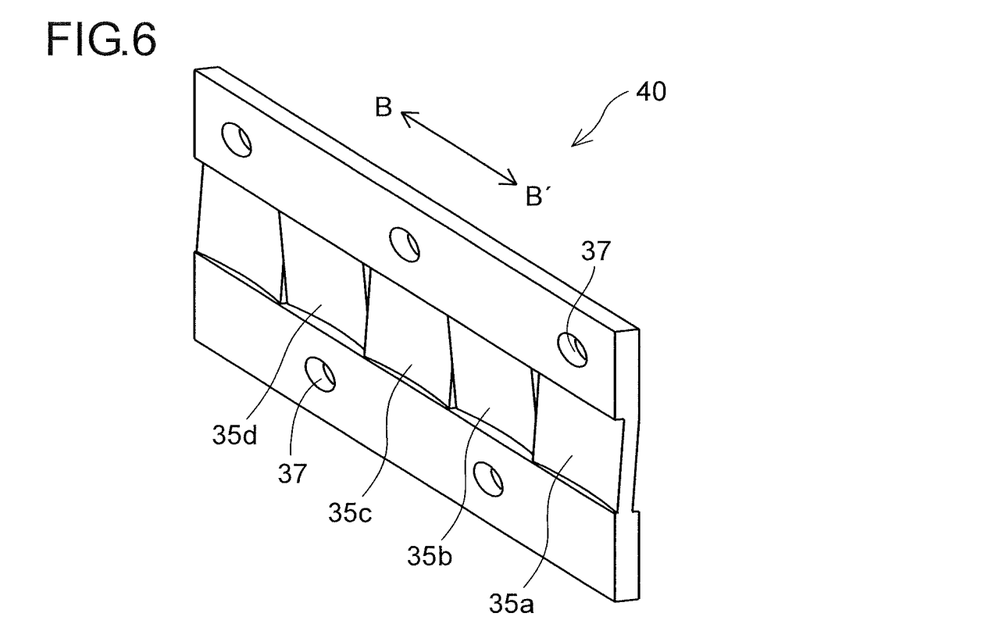
FIG. 6 is a partial perspective view illustrating a structure of the optical unit 40 in the reading module 50 according to one embodiment of the present disclosure.
Figure 7:
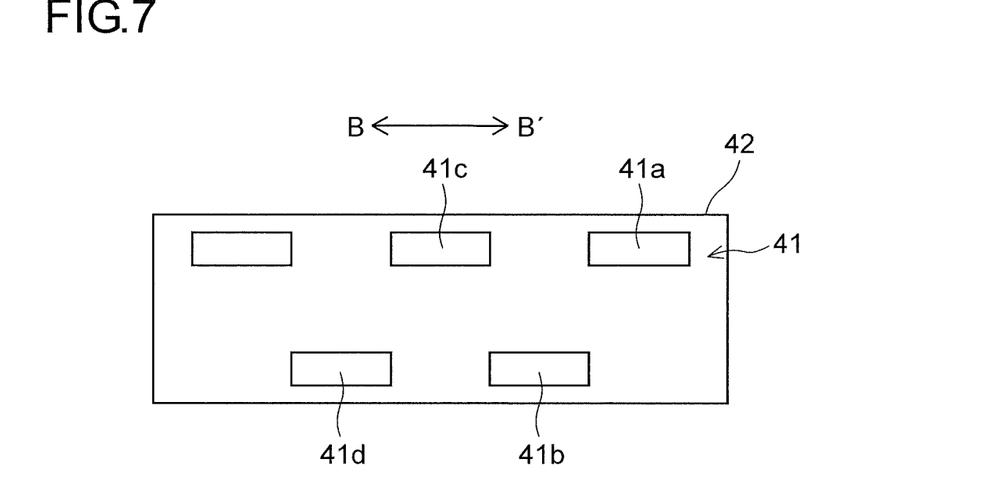
FIG. 7 is a diagram illustrating structures of the sensor 41 and the sensor substrate 42 in the reading module 50 according to one embodiment of the present disclosure.

Therefore, in this embodiment, as illustrated in FIG. 6, the reflection mirrors 35a, 35b, 35c, etc. are arranged so that neighboring reflection mirrors reflect the image light d at different angles viewed from the main scanning direction (arrow BB' direction). In addition, as illustrated in FIG. 7, the imaging areas 41a, 41b, etc. are arranged so that neighboring imaging areas do not overlap each other in a perpendicular direction (up and down direction) that is perpendicular to the main scanning direction.

Specifically, as illustrated in FIGS. 2 and 6, the plurality of reflection mirrors 35a, 35b, 35c, etc. are arranged alternately so as to reflect the image light d at a first angle or a second angle viewed from the main scanning direction. In other words, the reflection mirrors 35a, 35c, etc. are arranged so as to reflect the image light d at the first angle viewed from the main scanning direction, and the reflection mirrors 35b, 35d, etc. are arranged so as to reflect the image light d at the second angle viewed from the main scanning direction.

In addition, the reflection mirrors 35a, 35c, etc. are arranged so as to reflect the image light d to the upper direction than the image light d entering from the flat mirror 33c to the mirror array 35 (in the horizontal direction), and the reflection mirrors 35*b*, 35*d*, etc. are arranged so as to reflect the image light d to the lower direction than the image light d entering from the flat mirror 33*c* to the mirror array 35 (in the horizontal direction).

The plurality of aperture stops 37 are arranged alternately on one side (upper side) and the other side (lower side) of the mirror array 35 in the up and down direction.

The first turning mirror 34*a* reflects the image light d from the reflection mirrors 35*a*, 35*c*, etc. to the aperture stop 37 disposed on the upper side of the mirror array 35, while the second turning mirror 34*b* reflects the image light d from the reflection mirrors 35*b*, 35*d*, etc. to the aperture stop 37 disposed on the lower side of the mirror array 35. Note that the image light d reflected by the first turning mirror 34*a* and the image light d reflected by the second turning mirror 34*b* are parallel to each other and propagate in the same direction as the image light d entering from the flat mirror 33*c* to the mirror array 35 (in the horizontal direction).

As illustrated in FIG. 7, the plurality of imaging areas 41*a*, 41*b*, etc. are arranged in a zigzag pattern. In this example, the imaging areas 41*a*, 41*b*, etc. are alternately in two rows in the main scanning direction (one row constituted of the imaging areas 41*a*, 41*c*, etc. and the other row constituted of the imaging areas 41*b*, 41*d*, etc.), which are arranged in the up and down directions.

The imaging areas 41*a*, 41*c*, etc. and the imaging areas 41*b*, 41*d*, etc. are arranged with a predetermined gap therebetween in the up and down direction (a gap larger than a height of the mirror array 35 in the up and down direction). In addition, the imaging areas 41*a*, 41*b*, etc. are arranged so that the neighboring imaging areas have no gap therebetween in the main scanning direction (arrow BB' direction). In this example, the imaging areas 41*a*, 41*b*, etc. are arranged so that neighboring imaging areas overlap a little in the main scanning direction. Note that the imaging areas 41*a*, 41*b*, etc. are arranged to be perpendicular to the main light rays of the image light d entering the imaging areas 41*a*, 41*b*, etc.

In this embodiment, as described above, the reflection mirrors 35*a*, 35*b*, 35*c*, etc. are arranged so that neighboring reflection mirrors reflect light at different angles viewed from the main scanning direction, and the imaging areas 41*a*, 41*b*, 41*c*, etc. are arranged so that neighboring imaging areas do not overlap each other in the up and down direction. In this way, it is possible to prevent light reflected by the neighboring reflection mirrors 35*a*, 35*b*, 35*c*, etc. from passing through the aperture stop 37 and reaching the sensor 41 as flair light (stray light). Therefore, generation of an abnormal image can be prevented.

In addition, as described above, the plurality of reflection mirrors 35*a*, 35*b*, 35*c*, etc. are arranged alternately so as to reflect light in the first angle or the second angle viewed from the main scanning direction. In addition, the plurality of imaging areas 41*a*, 41*b*, 41*c*, etc. are arranged in a zigzag pattern. In other words, the imaging areas 41*a*, 41*b*, 41*c*, etc. are alternately arranged in two rows in the main scanning direction (one row constituted of the imaging areas 41*a*, 41*c*, etc. and the other row constituted of the imaging areas 41*b*, 41*d*, etc.), which are arranged in the up and down directions. In this way, compared with a case where three or more rows are arranged in the up and down direction, it is possible to prevent a space for disposing the sensor 41 from increasing in the up and down direction.

In addition, as described above, the plurality of aperture stops 37 are arranged alternately on the upper side or the lower side of the mirror array 35. In this way, it is possible to securely prevent light reflected by the neighboring reflection mirrors 35*a*, 35*b*, 35*c*, etc. from passing through the aperture stop 37 and reaching the sensor 41 as flair light (stray light).

In addition, as described above, the first turning mirror 34*a* and the second turning mirror 34*b* are arranged. In this way, light from the reflection mirrors 35*a*, 35*b*, 35*c*, etc. can be easily reflected to the aperture stops 37 disposed alternately on the upper side or the lower side of the mirror array 35.

Figure 8:
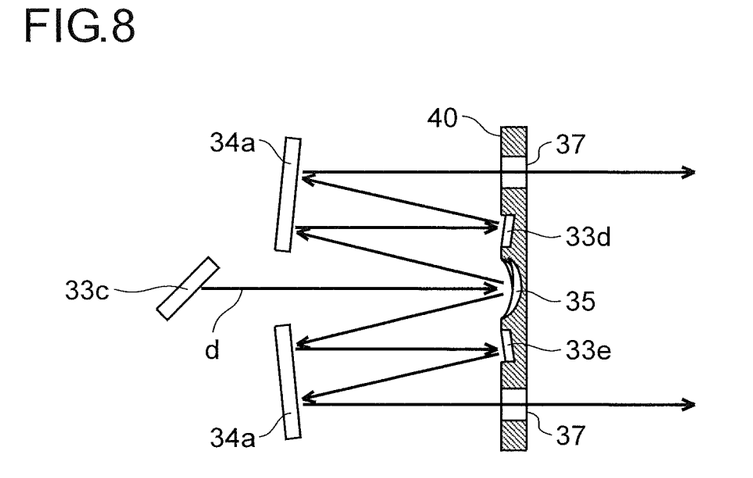
FIG. 8 is a partial cross-sectional view illustrating a variation of the reading module 50 according to one embodiment of the present disclosure, and is a diagram illustrating a structure in which the image light d is reflected twice by a first turning mirror 34a and a second turning mirror 34b.

Other than that, the present disclosure is not limited to the embodiment described above and can be variously modified within the scope of the present disclosure without deviating from the spirit thereof. For example, in the embodiment described above, the image light d, which is reflected by the mirror array 35 and enters the aperture stop 37, is reflected only once using the first turning mirror 34*a* or the second turning mirror 34*b*. However, it is possible to adopt a structure as illustrated in FIG. 8, in which a flat mirrors 33*d* and 33*e* are arranged on the optical unit 40 side, and hence the image light d is reflected twice or more times using the first turning mirror 34*a* or the second turning mirror 34*b*.

In addition, in the embodiment described above, the image reading unit 6 mounted in the image forming apparatus 100 is exemplified as the image reading device, but the present disclosure can be quite similarly applied to an image scanner that is used separately from the image forming apparatus 100.

In addition, in the embodiment described above, the case where the image light d from the document 60 enters the mirror array 35 via the flat mirrors 33*a* to 33*c* is exemplified, but the present disclosure is not limited to this. One or more of the flat mirrors 33*a* to 33*c* may be eliminated. For example, without the flat mirror 33*b*, the image light d reflect by the flat mirror 33*a* may directly enter the flat mirror 33*c*.

In addition, the embodiment described above exemplifies the case where the reflection mirrors 35*a*, 35*c*, etc. are arranged to reflect the image light d to the upper side of the horizontal direction, while the reflection mirrors 35*b*, 35*d*, etc. are arranged to reflect the image light d to the lower side of the horizontal direction, and the plurality of aperture stops 37 are arranged alternately on the upper side or the lower side of the mirror array 35, but the present disclosure is not limited to this. For example, it is possible to adopt a structure in which the reflection mirrors 35*a*, 35*c*, etc. are arranged so as to reflect the image light d to the upper side of the horizontal direction, the reflection mirrors 35*b*, 35*d*, etc. are arranged so as to reflect the image light d to the upper side of the horizontal direction, and the plurality of aperture stops 37 are arranged only on the upper side of the mirror array 35.

What is claimed is:
1. A reading module comprising:
a light source arranged to illuminate a document;
an optical system arranged to image reflected light of light emitted from the light source to the document, as image light; and
a sensor including a plurality of imaging areas for converting the image light imaged by the optical system into an electric signal, wherein
the optical system includes a mirror array including plurality of reflection mirrors connected in a main scanning direction in an array, each of the reflection mirrors having an aspheric concave reflecting surface, and a plurality of aperture stops each disposed between each reflection mirror and each imaging area of the sensor so as to adjust light intensity of the image light reflected by each reflection mirror, the reflection mirrors are arranged so that neighboring reflection mirrors reflect light at different angles viewed from the main scanning direction, and the imaging areas are arranged so that neighboring imaging areas do not overlap each other in a perpendicular direction that is perpendicular to the main scanning direction.

2. The reading module according to claim 1, wherein
the plurality of reflection mirrors are arranged alternately so as to reflect light at a first angle or a second angle viewed from the main scanning direction, and the plurality of imaging areas are arranged in a zigzag pattern.

3. The reading module according to claim 1, wherein the plurality of aperture stops are arranged alternately on one side or the other side of the mirror array in the perpendicular direction.

4. The reading module according to claim 3, further comprising a first turning mirror arranged to reflect light from the reflection mirror to an aperture stop disposed on one side of the mirror array in the perpendicular direction, and a second turning mirror arranged to reflect light from the reflection mirror to an aperture stop disposed on the other side of the mirror array in the perpendicular direction.

5. The reading module according to claim 1, wherein the mirror array and the aperture stop are integrally formed.

6. The reading module according to claim 1, wherein the optical system is a telecentric optical system in which image light rays are parallel to the optical axis on a document side of the mirror array, so as to image an inverted image on the sensor.

7. The reading module according to claim 6, wherein image data read by each imaging area of the sensor is inverted to be an erected image, and images of the imaging areas are combined so that a read image corresponding to the document is formed.

8. An image reading device comprising:
a contact glass fixed to an upper surface of an image reading unit;
a document feeder arranged to be capable of opening and closing in the up and down direction with respect to the contact glass and to feed a document to an image reading position of the contact glass; and
the reading module according to claim 1 arranged to be capable of reciprocating in a sub-scanning direction below the contact glass, wherein
the reading module is capable of reading an image of a document placed on the contact glass while moving in sub-scanning direction, and is capable of reading an image of a document fed to the image reading position while stopping at a position facing the image reading position.

9. An image forming apparatus comprising the image reading device according to claim 8.

* * * * *